US012607281B2

(12) United States Patent (10) Patent No.: US 12,607,281 B2
Mcmillan (45) Date of Patent: Apr. 21, 2026

(54) PIPE COUPLING

(71) Applicant: Jaron Lyell Mcmillan, Christchurch (NZ)

(72) Inventor: Jaron Lyell Mcmillan, Christchurch (NZ)

( * ) Notice: Subject to any disclaimer, the term of this patent is extended or adjusted under 35 U.S.C. 154(b) by 382 days.

(21) Appl. No.: 17/621,077

(22) PCT Filed: Jun. 11, 2020

(86) PCT No.: PCT/IB2020/055506
§ 371 (c)(1),
(2) Date: Dec. 20, 2021

(87) PCT Pub. No.: WO2020/254926
PCT Pub. Date: Dec. 24, 2020

(65) Prior Publication Data
US 2022/0412487 A1 Dec. 29, 2022

(30) Foreign Application Priority Data

Jun. 19, 2019 (NZ) ........................................ 754719

(51) Int. Cl.
*F16L 25/08* (2006.01)
*E21B 17/046* (2006.01)
*F16L 21/00* (2006.01)

(52) U.S. Cl.
CPC ........ *F16L 21/002* (2013.01); *E21B 17/0465* (2020.05); *F16L 25/08* (2013.01)

(58) Field of Classification Search
CPC .... E21B 17/046; E21B 17/0465; F16L 25/08; F16L 25/06; F16L 37/146; F16L 25/065
(Continued)

(56) References Cited

U.S. PATENT DOCUMENTS 3,472,538 A * 10/1969 Wilder .................. F16L 25/065
285/403
9,995,087 B2 6/2018 Queen
(Continued)

FOREIGN PATENT DOCUMENTS

DE DD-59760 * 1/1968 ........... E21B 17/046
DE 2165827 A1 * 7/1973
(Continued)

OTHER PUBLICATIONS

Translation for DE-4032928 (Year: 1992).*
Translation for DE-2165827 (Year: 1973).*

*Primary Examiner* — Matthew Troutman
*Assistant Examiner* — Alexander T Rufrano
(74) *Attorney, Agent, or Firm* — SALIWANCHIK, LLOYD & EISENSCHENK

(57) ABSTRACT

Pipe coupling: a male portion (13) provided with a series of spaced keys (15); a female portion (14) provided with a series of spaced keyways (16) so the keys are a sliding fit; a fastener including a male portion fitting (17) secured to or formed in the male portion (13) and providing at least one internally screw-threaded bore (17*b*); a female portion socket attached to or formed in the female portion, said female portion socket (18*a*) including a central aperture (23) shaped to receive a plug (24), both the female portion socket and the plug being radiused to match the radius of the female portion; a securing bolt (27) dimensioned to fit in a corresponding fixing aperture (26) formed in said plug and engage with said bore (17*b*); wherein when the at least one fastener is assembled the plug is a circumferential clearance fit in the female portion socket.

20 Claims, 13 Drawing Sheets

(58) Field of Classification Search
 USPC .......................................................... 285/91
 See application file for complete search history.

(56) References Cited

U.S. PATENT DOCUMENTS

| | | | | |
|---|---|---|---|---|
| 10,077,858 | B2 * | 9/2018 | Pallini, Jr. ............... | F16L 15/06 |
| 10,392,871 | B2 * | 8/2019 | Fenwick ................. | E21B 17/18 |
| 2007/0254516 | A1 | 11/2007 | Stoetzer | |

FOREIGN PATENT DOCUMENTS

| | | | | | |
|---|---|---|---|---|---|
| DE | 2617554 | A | * | 11/1977 | ........... E21B 17/046 |
| DE | DD-157723 | A1 | * | 12/1982 | |
| DE | 3942030 | A1 | | 6/1991 | |
| DE | 4032928 | A1 | * | 4/1992 | |
| DE | 10015497 | A1 | * | 1/2001 | ............. E21B 17/02 |
| DE | 202011005409 | U1 | * | 11/2011 | ............. E21B 17/08 |

* cited by examiner

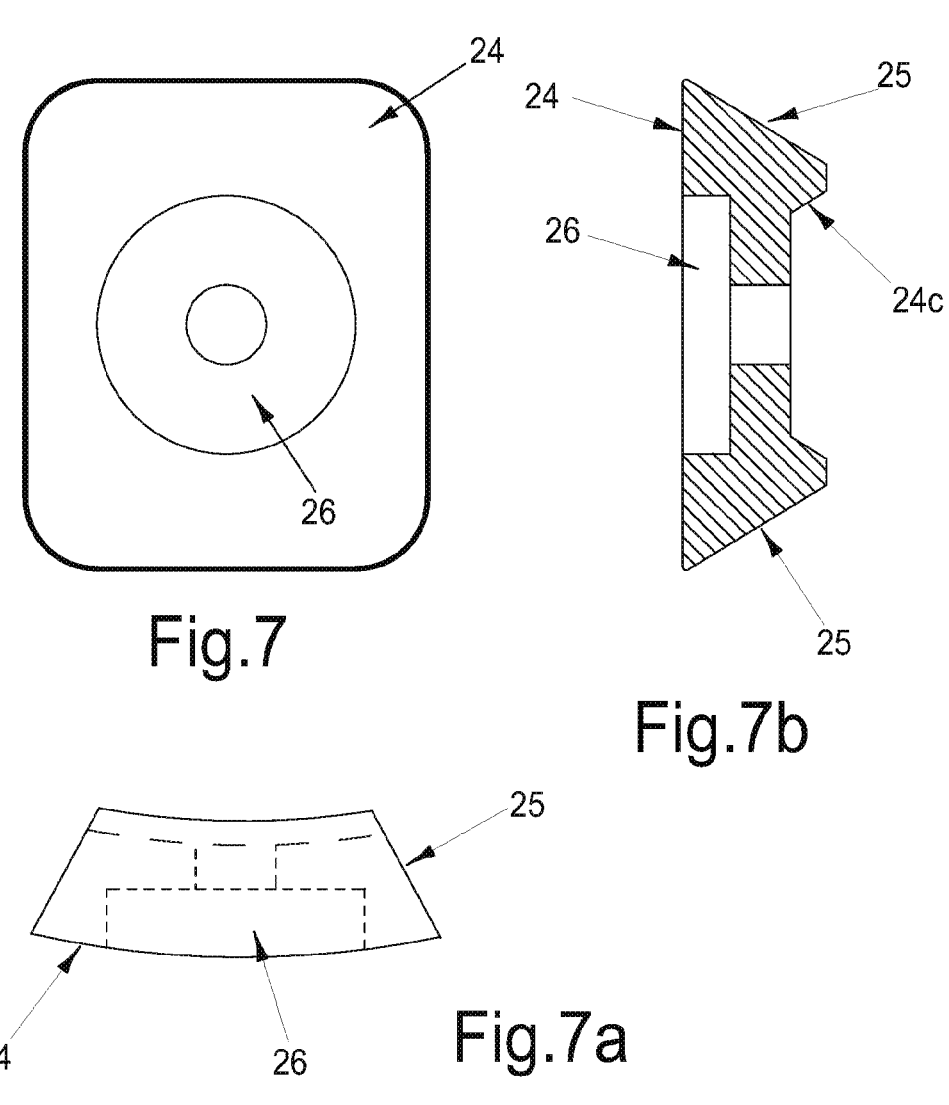
Fig.7
Fig.7b
Fig.7a
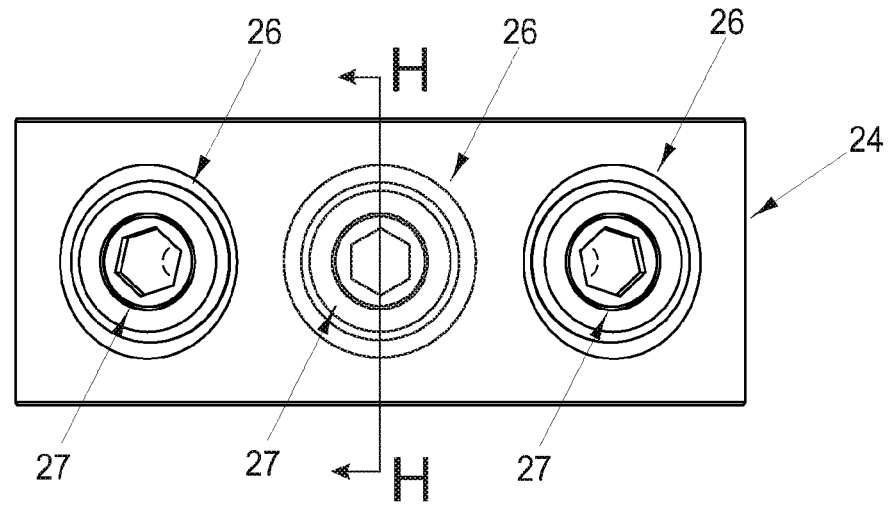
Fig. 17

PIPE COUPLING

CROSS REFERENCE TO RELATED APPLICATIONS

This application is a National Stage Application of International Application Number PCT/IB2020/055506, filed Jun. 11, 2020; which claims priority to New Zealand Application No. 754719, filed Jun. 19, 2019.

TECHNICAL FIELD

The present invention relates to an improved design of pipe coupling, used to join two pipes together end to end.

The pipe coupling of the present invention may be used to join pipes of any of a large range of diameters, made of any of a large range of materials, but has been designed in particular to join large diameter steel pipes of the type used in drilling equipment, where the forces on the pipes are high; the invention will be described with especial reference to this application.

BACKGROUND ART

At present, drill pipes commonly are joined together by a coupling of the general type shown in FIG. 1, which shows an exploded side view of parts of two pipes and a coupling; and FIG. 1A, which shows a section on line L-L of FIG. 1 when the pipes are coupled together.

Referring to FIG. 1, and FIG. 1a when required, a first pipe 10 is joined to a second pipe 11, by a pipe coupling 12 which includes a male portion 13 welded to the free end of the first pipe 10, and a female portion 14, welded to the free end of the second pipe 11. The male and female portions 13, 14 are coaxial with the pipes 10,11 to which they are attached.

The male portion 13 is smaller in diameter than the female portion 14 (clearances are exaggerated in the drawing, for clarity) so that the male portion 13 is an easy sliding fit within the female portion 14. The male portion 13 is formed with rigidly secured or cast in series of spaced keys 15, spaced around the edge of the male portion 13 which is adjacent the first pipe 10 to which it is secured. The female portion 14 is formed with corresponding keyways 16, which are cut-outs around the free edge of the female portion 14. Each keyway 16 is sized so that each key 15 is an easy sliding fit into the corresponding keyway 16 when the male portion 13 is in position in the female portion 14.

In this position, each of a series of spaced fasteners which include sets of apertures 17, 18 on the male and female portions 13,14 respectively, are aligned. The male and female portions 13,14 are formed with a plurality of these fasteners, but for clarity, only one fastener shown in the drawing.

Within each male aperture 17 on the male portion 13 is a male socket 17a with an inner screw threaded boss 17b. Each male socket 17a is welded to the corresponding male aperture 17. Each screw threaded boss 17b is countersunk into the male socket 17a, so that when each male socket 17a is in position in the corresponding male aperture 17, the outer surface of both the male socket 17a and the boss 17b are flush with the outer surface of the male portion 13.

Within each female aperture 18 on the female portion 14 is a complimentary female portion socket 18a.

The sockets 17a, 18a are circular in plan view, and the inner surface of each socket 17a, 18a is tapered to receive a plug 18b (FIG. 1A) the outer surface of which has a corresponding taper, the tapered portions of the sockets 17a,18a in combination form a fastener socket for the associated plug 18b. When assembled each plug 18b is a sliding fit within the fastener socket. Each plug 18b carries a central captive screw threaded connector 18d which is arranged and dimensioned to engage the screw threaded boss 17b when the apertures 17, 18 of each fastener are aligned. The outer surface 17c of the male socket 17a is contoured to match the opposing surfaces of the female portion socket 18a and plug 18b when the apertures 17, 18 are aligned.

Thus, to secure the pipe coupling 12 in position, the male portion 13 is slid into the female portion 14 with the keys 15 received within the keyways 16 and the apertures 17, 18 of each fastener aligned. The screw threaded connector 18d in each plug 18b is then screwed into the corresponding boss 17b for each of the sets of aligned apertures 17, 18. It follows that the two pipes, 10, 11 are connected together not only by the engagement of the keys 15 and the keyways 16, but also by each of the fasteners.

Thus, each fastener is a tapered plug 18b inserted into a corresponding tapered fastener socket formed by the combination of male and female portion sockets 17a,18a. The plug 18b including a central void dimensioned to engage with a centrally located threaded boss 17b that extends from the base of the portion of the male socket 17a, and, in use, the screw threaded connector 18d acting to retain the plug 18b in the fastener socket.

In theory, the above described pipe coupling 12 provides a strong and secure connection between the pipes 10,11. In practice, pipe couplings 12 of this type frequently fail due to failure of the fasteners. In use, the longitudinal (compressive) forces are transmitted from the pipe 10 to the pipe 11 both by the engagement between the keys 15 and keyways 16 and, to a lesser extent between the engagement of the fasteners, but predominantly by the engagement of the shoulder 10a (male shoulder) formed at the junction between the male portion 13 and the pipe 10, with the free end 14a of the female portion 14, and by the engagement between the end 13a of the male portion 13 and the end 11a (female shoulder) of the pipe 11. However, the torsional forces are substantially higher as the coupled pipes 10,11 are rotated. Typically, for a 355 millimetres diameter pipe, the longitudinal forces are of the order of 40-50 tonnes, whereas the torsional forces (torque) can be of the order of 145 tonne.m. [

Torsional forces are transmitted from one pipe 10,11 to the other by engagement between the keys 15 and keyways 16, and by the fasteners. Unfortunately, the keys 15 and keyways 16 tend to be a relatively loose fit, due to machining tolerances, and this passes a portion of the torsional forces onto the fasteners. As soon as wear occurs between the keys 15 and the keyways 16, this increases the load on the tapered portions of the surrounds and plugs of the fasteners, and tends to cause excessive wear of these components. This wear can allow more rotary movement between the two portions 13, 14 of the pipe coupling 12, and this of course increases the wear and allows increasing movement:— the cycle continues until one or more of the plugs 18b fail, or one or more of the screw threaded connectors 18d does, leading to general failing of the fastener and potentially the failure of the coupling 12.

DISCLOSURE OF INVENTION

An object of the present invention is the provision of a pipe coupling which overcomes at least some of the above described drawbacks, or at least provides the consumer with a useful choice.

The present invention provides a pipe coupling which includes:

a male portion which in use is rigidly secured to one end of a first pipe, coaxial with said pipe;

a female portion which in use is rigidly secured to one end of a second pipe, coaxial with said pipe;

the male and female portions being sized so that the male portion is an easy sliding fit within the female portion when the first and second pipes are connected together;

the male portion being provided with a series of spaced keys protruding from the outer surface thereof;

the female portion being provided with a series of spaced keyways which are dimensioned and arranged so that the keys are a sliding fit within the keyways when the male and female portions are connected together;

at least one fastener, each of the at least one fastener including:

a male portion fitting rigidly secured to the male portion and providing at least one internally screw-threaded bore;

a female portion socket rigidly attached to, or formed into, the female portion, said female portion socket including a central aperture which is shaped to receive a plug therein, said female portion socket and said plug being radiused to match the radius of the female portion, and being substantially rectangular in plan;

a securing bolt dimensioned to fit in a corresponding fixing aperture formed in said plug, said securing bolt being releasably engageable with a corresponding bore;

wherein said plug is sized relative to the female portion socket such that the plug has a predetermined amount of movement relative to the socket in either direction around the circumference of the female portion, even when each securing bolt present is engaged with the corresponding bore.

In other words, the present invention provides a pipe coupling which includes:

a male portion which is rigidly, co-axially, secured to one end of a first pipe;

a female portion which is rigidly, co-axially, secured to one end of a second pipe;

the male and female portions are dimensioned to be an easy sliding fit when assembled;

the male portion being provided with a series of spaced keys;

the female portion being provided with a series of spaced keyways which are dimensioned and arranged so that the keys are a sliding fit within the keyways when the male and female portions are connected together;

at least one fastener including:

a male portion fitting rigidly secured to, or formed in, the male portion and providing at least one internally screw-threaded bore;

a female portion socket rigidly attached to, or formed into, the female portion, said female portion socket including a central aperture which is shaped to receive a plug therein, both the female portion socket and the plug being radiused to match the radius of the female portion;

a securing bolt dimensioned to fit in a corresponding fixing aperture formed in said plug and engage with said bore;

wherein when the at least one fastener is assembled the plug is a circumferential clearance fit in the female portion socket.

Preferably there are plurality of male portion fittings spaced around the male portion and a corresponding plurality of female portion sockets spaced around the female portion. Preferably the plurality of male portion fittings and female portion sockets are circumferentially equispaced around the male portion and female portion respectively. Preferably there is more than one fixing aperture in each plug. In a highly preferred form at least one securing bolt is captive in the corresponding fixing aperture. Preferably there are 2 to 4 fixing apertures in each plug.

Preferably the predetermined amount of movement between the plug and the corresponding central aperture is (WA-W)=0.5 mm to 50 mm, where WA is the circumferential dimension of the central aperture and W is the circumferential length of the plug. In a more preferred form (WA-W)=1 mm to 13 mm. In a highly preferred form (WA-W)=2 mm to 8 mm.

Preferably there is a predetermined securing clearance between corresponding fixing apertures and the securing bolt which they receive. Preferably this predetermined securing clearance is between 0.05D and 0.2D, where D is the securing bolt diameter.

Preferably the plug is tapered on all faces that engage with the male portion fitting or female portion socket. In an alternative preferred form, the plug is only tapered for the portion that engages with the female portion socket. In a further alternative preferred form, the plug is tapered for the portion that engages with the male portion fitting but a lip engaged with a corresponding surface where it engages with the female portion socket. In an alternative form there is no lip present. Preferably, where possible, the taper is radially aligned to the female portion.

In one preferred option the circumferentially separated opposite faces of the central aperture, the central aperture end faces, when viewed in cross section, are parallel to a radial line extending from the centre of the female portion through the centre of the central aperture. Preferably the circumferentially separated opposite ends of the plug, the plug ends, in cross section are, in use, radially aligned to the female portion.

In an alternative preferred option the circumferentially separated opposite faces of the central aperture, the central aperture end faces, when viewed in cross section, are parallel to a radial line extending from the centre of the female portion and the circumferentially separated opposite ends of the plug, plug ends, in cross section are, in use, radially aligned to the female portion.

Preferably securing bolts are threaded fixing devices; namely elongate members with a drive section and a threaded section configured to engage with a corresponding threaded cavity/rod, said drive section including features configured to be engage with a tool so that it can be rotated. In a preferred form the securing bolts are a threaded fixing device selected from the list consisting of screws, set screws and bolts.

BRIEF DESCRIPTION OF DRAWINGS

By way of example only, a preferred embodiment of the present invention is described in detail with reference to the accompanying drawings, in which:—

FIG. 7 is a side view of a plug to be inserted into the socket;

FIG. 7*a* is a plan view of the plug;

FIG. 7*b* is a cross-section through the plug;

FIG. 17 is a plan view of a variant plug which includes three securing bolts one being captive;

BEST MODE FOR CARRYING OUT THE INVENTION

Figure 1:
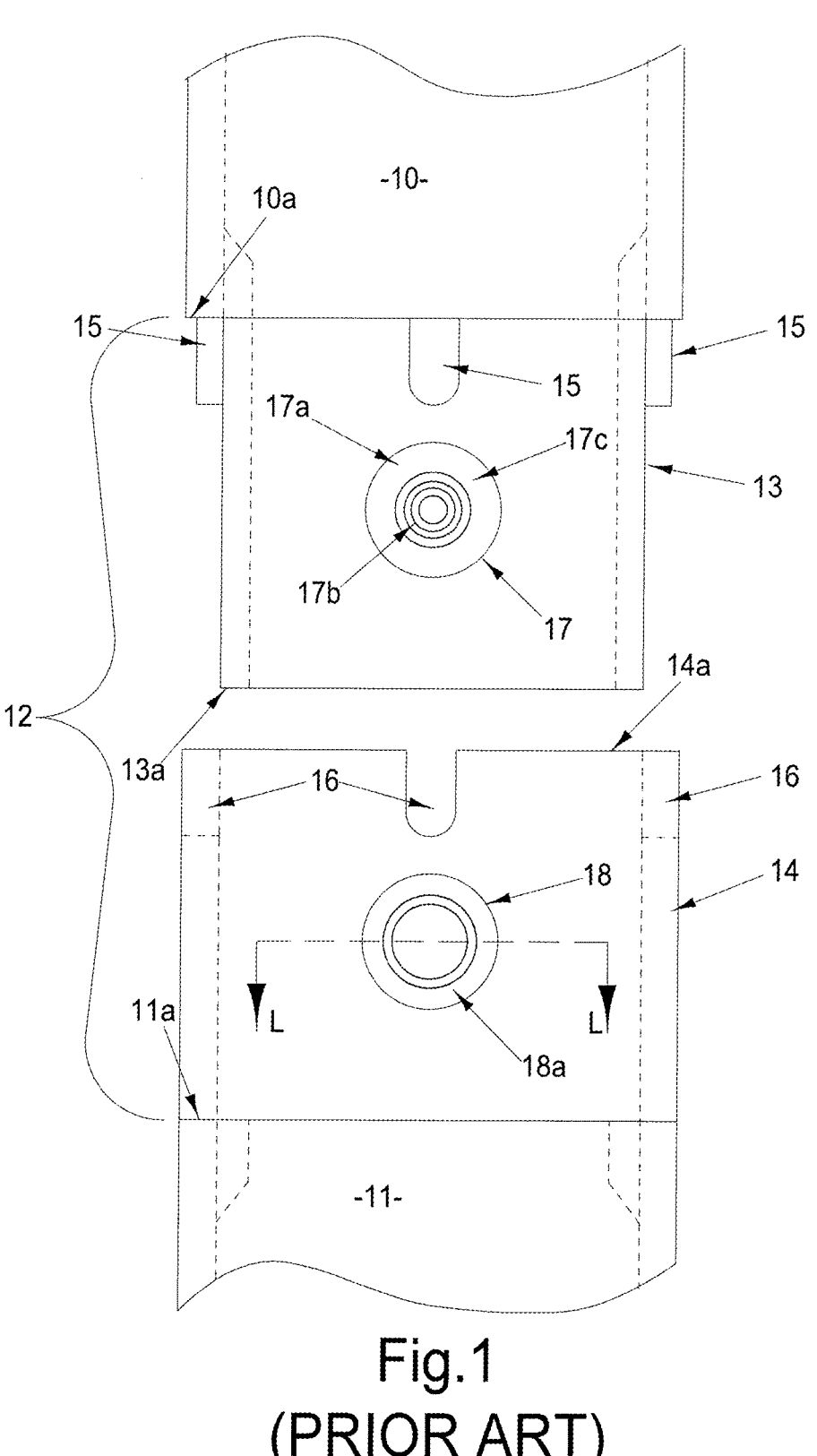
FIG. 1 is a diagrammatic exploded side view of a pipe coupling in accordance with the prior art.
Figure 1A:
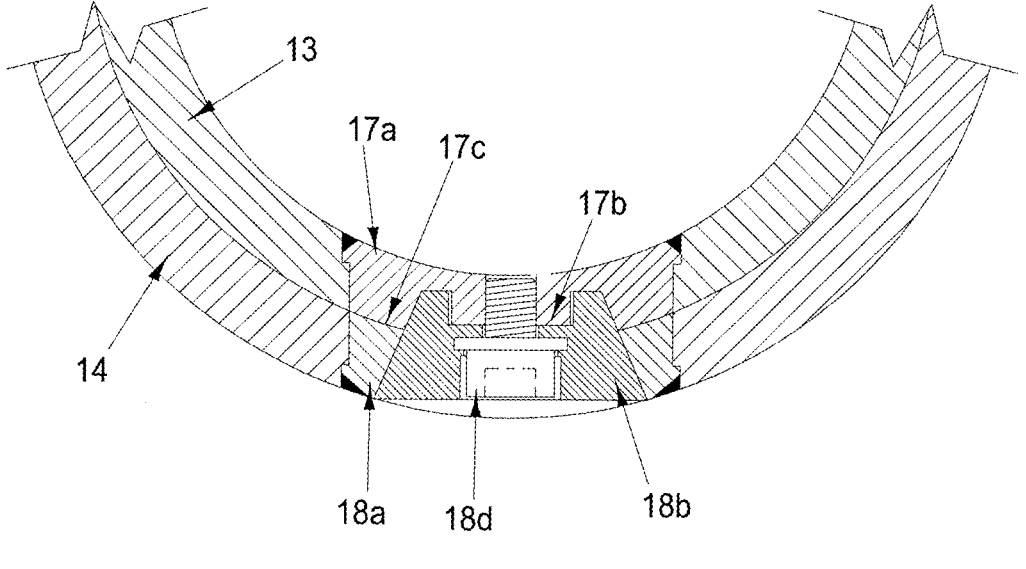
FIG. 1A is a section on line L-L of FIG. 1 when the male and female portions are in the connected position.
Figure 2:
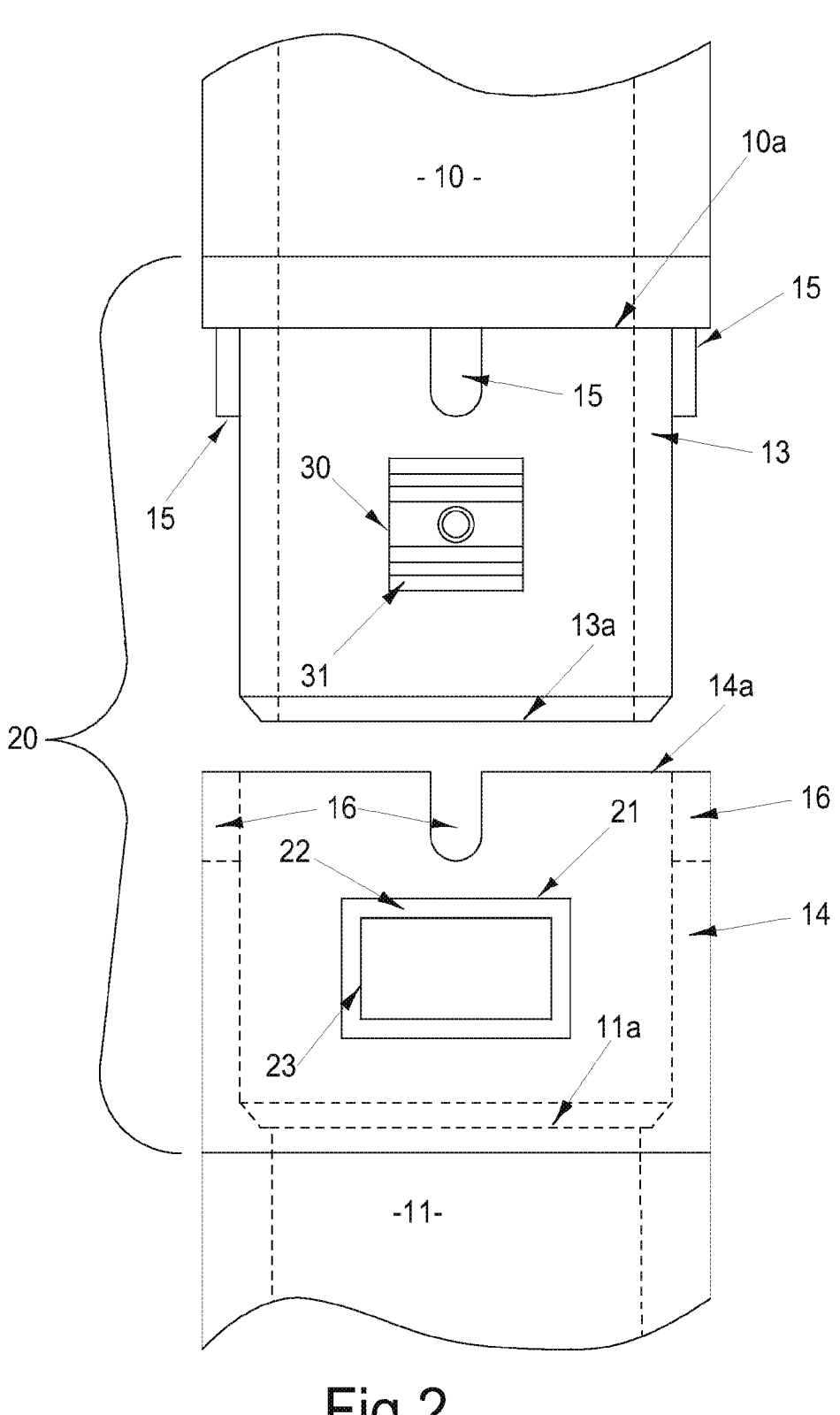
FIG. 2 is a diagrammatic exploded side view of a pipe coupling in accordance with the present invention.

Referring to FIGS. 2-7 of the drawings, a pipe coupling 20 in accordance with the present invention differs from the pipe coupling 12 shown and described with reference to FIGS. 1 and 1*a* only in respect of the design of the fasteners, as described below. Thus, in FIG. 2, the same reference numerals are used for the first and second pipes 10/11, the male and female portions 13/14 of the coupling 20, the keys 15 and keyways 16. In addition, the male shoulder 10*a* engages the free end 14*a* of the female portion 14, and the end 13*a* of the male portion 13 of the coupling 20 engages the female shoulder 11*a*. In FIG. 2 the male shoulder 10*a* and the keys 15 are shown formed as part of the male portion 13 which is rigidly attached to the first pipe 10, and the female shoulder 11*a* is an internal shoulder formed inside the female portion 14. In other variants the male shoulder 10*a* may be the exposed end of the first pipe 10 and the female shoulder 11*a* the end of second pipe 11 as shown in FIG. 1.

The female portion 14 is formed with a female aperture 21 which has a female portion socket 22 rigidly secured thereto (generally by welding). The female portion socket 22 is generally rectangular in plan view, and has a central aperture 23 the sides of which angle inwards towards the inner surface of the female portion 14. A plug 24 has sidewalls 25 which are angled to match the angle of the central aperture 23, and is dimensioned so that the plug 24 is a sliding fit within the central aperture 23. However, the plug 24 has a width W which is less than the width WA of the central aperture 23. This leaves a gap (WA-W) between the sides of the plug 24 and the adjacent walls of the central aperture 23 of approximately 5 millimetres (preferably 4 mm to 6 mm, though this can be anything in the range of 1 mm to 50 mm), so that the plug 24 can move sideways (circumferentially) relative to the sides of the female portion socket 22. This movement allows the portions 13,14 to move relative to each other until the keys 15/keyways 16 engage and the pipes 10/11 rotate together.]

It is preferred that (WA-W)=1 mm to 50 mm, where WA is the circumferential dimension of the central aperture 23 and W is the circumferential length of the plug 24. This wide range takes into account the wide range of pipe diameters and wear that may occur in keys 15/keyways 16. For most pipes (WA-W) will be from 1 mm to 15 mm, though it is felt (WA-W)=2 mm to 8 mm will be the optimal range.

The centre of the plug 24 is formed with a counterbored fixing aperture 26 which receives a securing bolt 27. The lower end of the securing bolt 27 is screw threaded, and in use engages the screw thread formed on a corresponding boss 17*b*, as described below. In some configurations one or more securing bolt 27 is a captive bolt similar to that used in the prior art. Though referred to as securing bolts 27 these may be any form of threaded fixing device or fastener including bolts, screws, set screws, etc; namely an elongate member with a drive section and a threaded section configured to engage with a corresponding threaded cavity, said drive section including features configured to be engage with a tool so that it can be rotated.

Figure 6:
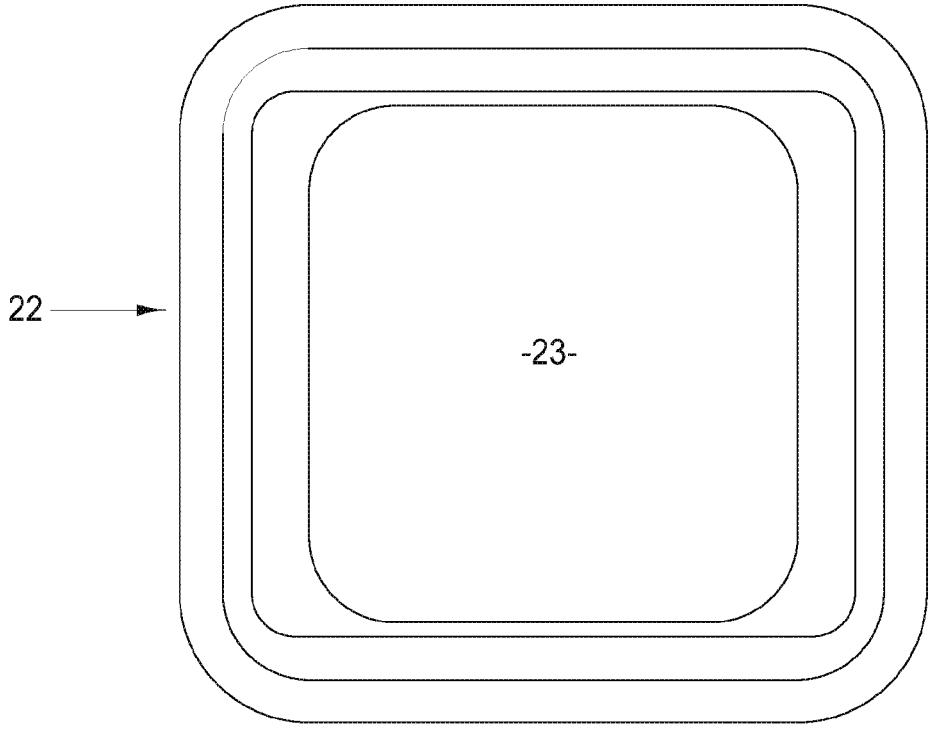
FIG. 6 is a side view of a socket to be secured to the female portion of the coupling.
Figure 6A:
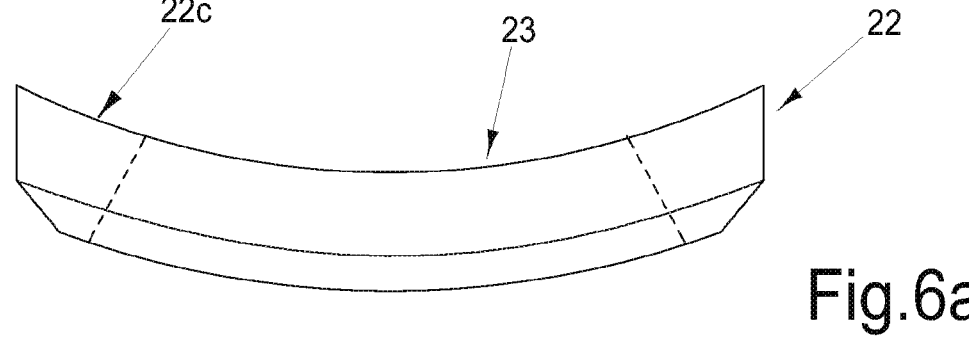
FIG. 6*a* is a plan view of the socket of FIG. 6.

The female portion socket 22 is radiused such that when rigidly attached to the female portion 14 it matches the radius of the female portion 14, as shown in FIG. 6*a*. The plug 24 is radiused to match the female portion socket 22, as shown in FIG. 7*a*.

Because the female portion socket 22 and plug 24 are rectangular in plan, and thus can easily be radiused to fit the curve of the pipe coupling 20, these components can be made larger than the normal non-radiused circular sockets and plugs used in the prior art coupling. The prior art sockets are ground to allow the male and female portions 13,14 to engage. The larger the dimensions of each socket and plug, the greater the area on which tensile forces can bear.

Figures 3, 4:
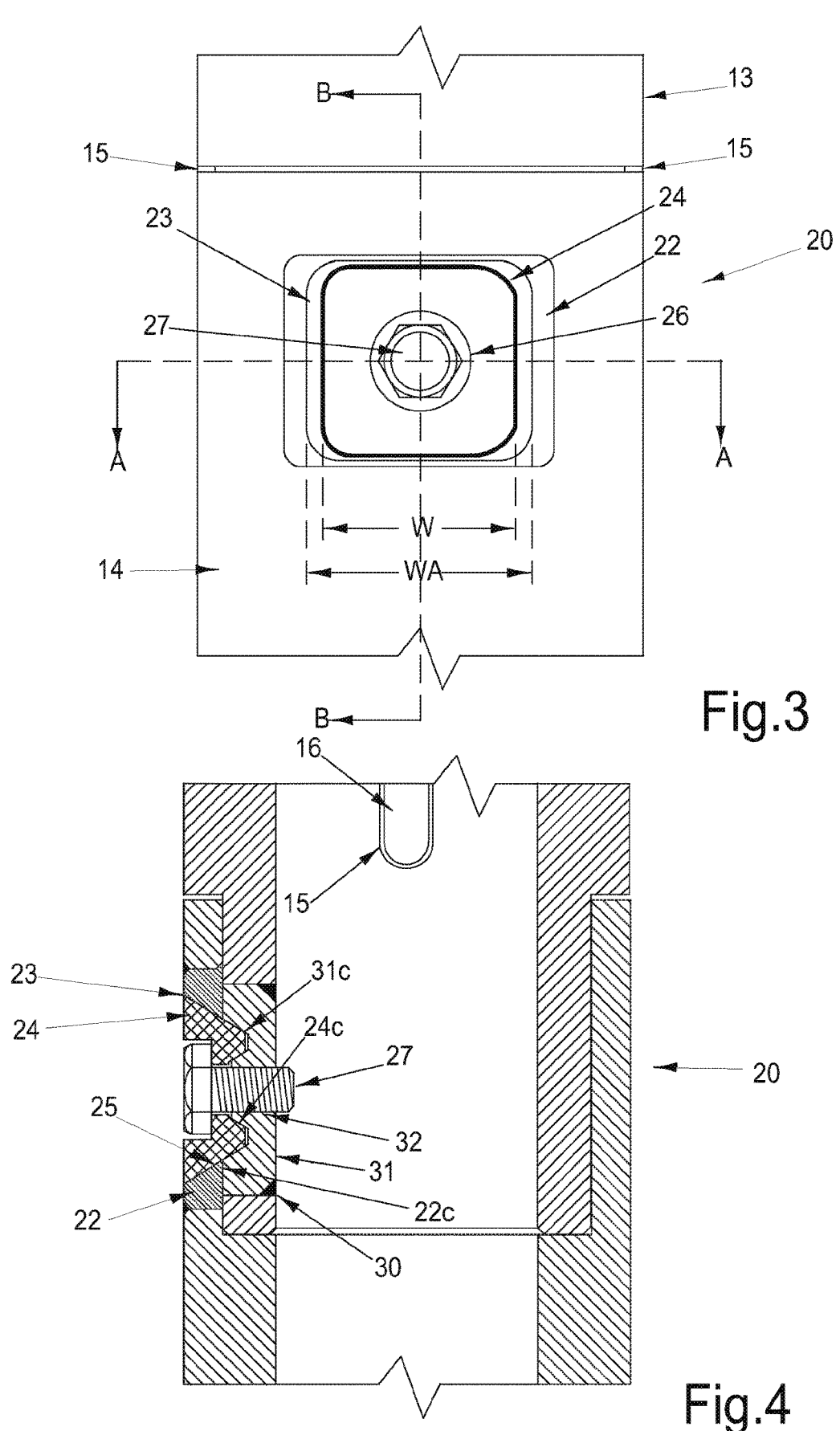
FIG. 3 is a side view of the pipe coupling of FIG. 2 in assembled form.
FIG. 4 is a section on line B-B of FIG. 3.

The inner surfaces 22*c*, 24*c* of the female portion socket 22 and plug 24 respectively (i.e. the surfaces which in use lie adjacent the male portion 13 of the coupling 20) are contoured as shown in FIG. 4.

The male portion 13 is formed with a fitting aperture 30 which has a male portion fitting 31 rigidly secured thereto (generally by welding), though the male portion fitting 31 can be formed into the male portion 13. Like the female portion socket 22, the male portion fitting 31 is generally rectangular in plan view and its outer surface 31*c* is contoured to match the contouring on the inner surfaces 22c and 24c, so that the female portion socket 22, male portion fitting 31 and plug 24 engage when the fasteners are secured.

In the centre of the male portion fitting 31 is a boss 32, with a central internally screw threaded aperture which is sized to engage the lower end of the securing bolt 27. Said securing bolt 27 is shown as free but it can be a captive bolt as shown in the prior art configuration (see FIG. 1a).

FIGS. 8-12 show a variant design in which the female portion sockets 22a are enlarged to accommodate two bosses 32 on the male portion 13 of the pipe 10. In the example illustrated, the female portion socket 22a is enlarged so that it covers two bosses 32; the plug 24a is similarly enlarged to provide two fixing apertures 26 for receiving a bolt 27 in each aperture 26. Because the female portion socket 22a and the plug 24a are radiused to match the curve of the portions 13,14, the size of the fastener can be circumferentially enlarged without any drop in efficiency. The ability to provide a circumferentially larger fastener means that it may be possible to reduce the length of the coupling 20, because it is possible to provide a large number of securing bolts 27 in a relatively short coupling 20. Though the securing bolts 27 are shown as free one or both in each pair may be captive, though this will depend on the circumferential separation of said securing bolts 27.

Figure 11:
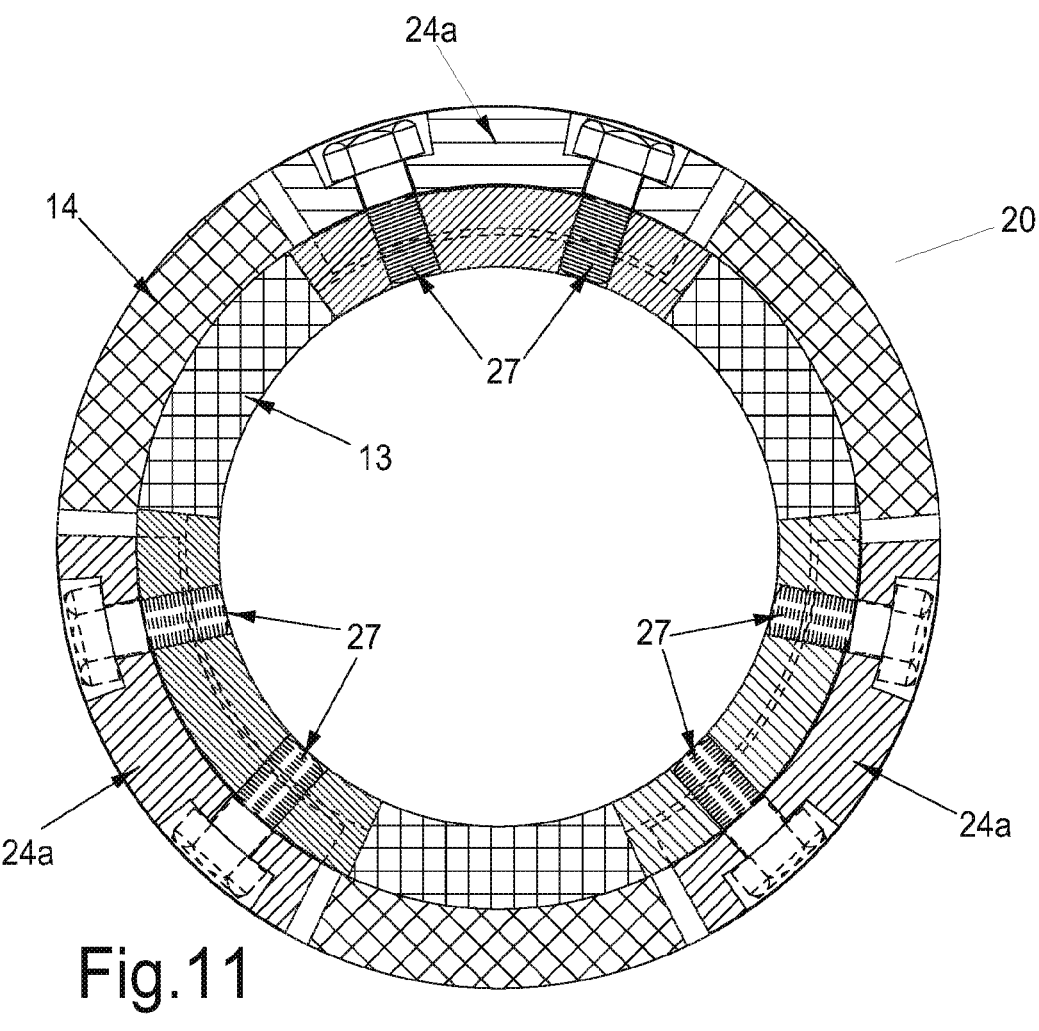
FIG. 11 is a cross-section through the coupling of FIG. 8 along line C-C, showing three pairs of securing bolts.

FIG. 11 shows a section through a coupling 20 which provides three pairs of securing bolts 27 of this type, with the pairs of securing bolts 27 equidistantly spaced around the circumference of the coupling 20.

Figures 8, 9, 10:
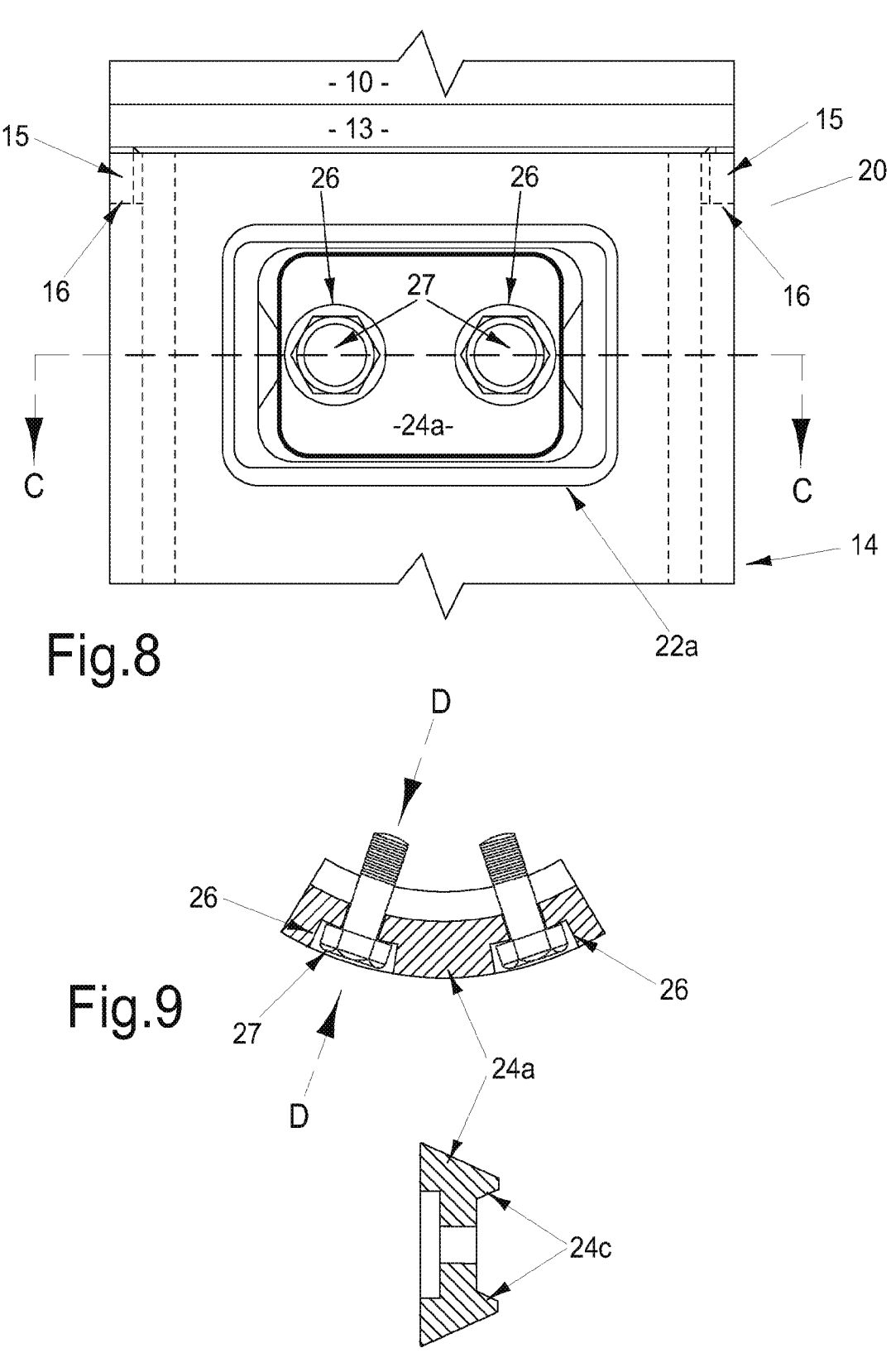
FIG. 8 is a side view of a variant coupling design, with two securing bolts side-by-side.
FIG. 9 is a section on line C-C of the plug with securing bolts used in the variant design shown in FIG. 8.
FIG. 10 is a section on line D-D of the plug shown in FIG. 9 without securing bolts shown.
Figure 12:
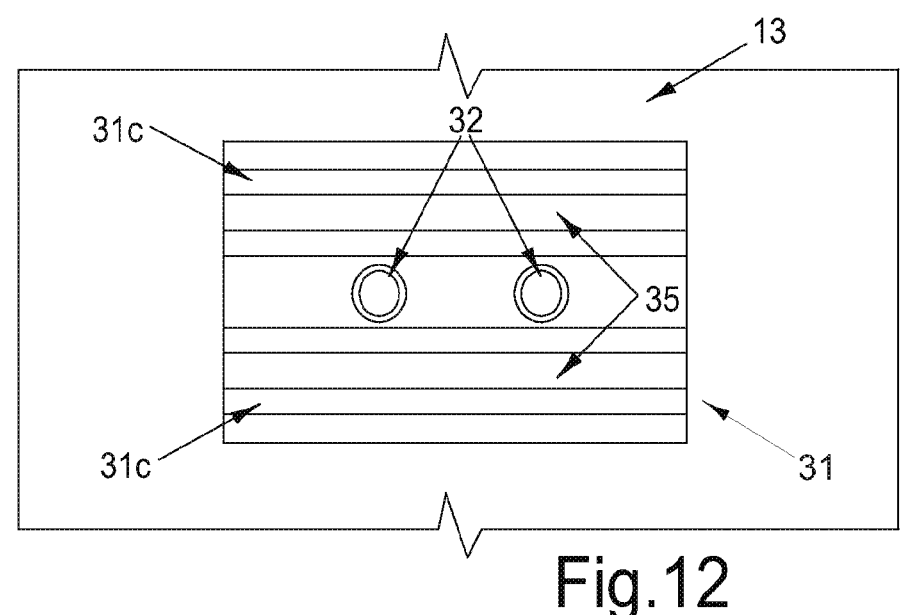
FIG. 12 is a side view of part of a pair of securing bolts on the male portion of the coupling.

FIG. 12 shows a detail of the fastener on the male portion 13 of the coupling 20:—a pair of bosses 32 are mounted on a male portion fitting 31 which is generally rectangular in plan view with a contoured outer surface 31c providing a pair of deep V-cross section grooves 35 which receive, and match, the contouring on the plug inner surfaces 24c on each of the plugs 24 (see FIG. 10).

It will be appreciated that further variant designs are possible in which the fasteners on the male and female portions 13,14 of the coupling 20 are enlarged to accommodate more than two bosses 32 on the male portion 13 of the pipe 10.

The above described coupling 20 is used as follows (Referring to any of FIGS. 2 to 19 where appropriate):— the male portion 13 of the coupling 20 is formed as described above and when fully inserted into the female portion 14 of the coupling 20 engages with the female portion 14 of the coupling 20 in at least the following ways:

by means of the engagement between the male shoulder
      10a of the coupling 20 and the free end 14a of the
      female portion 14, and/or by the engagement between
      the end 13a of the male portion 13 and the female
      shoulder 11a.
   by engagement between the keys 15 and keyways 16;
   by means of the engagement between the contoured
      surfaces 22c, 24c and 31c;
   by means of securing bolts 27 extending through the
      fixing apertures 26 in the plugs 24 and into the bosses
      32 secured to the male portion 13 of the coupling 20.

The majority of the compressive loading on the coupling 20, under normal conditions, is absorbed by engagement of the male shoulder 10a with the free end 14a of the female portion 14, and/or the engagement of the end 13a of the male portion 13 of the coupling 20 with the female shoulder 11a. With the torsional loading on the coupling 20 transmitted, under normal conditions, primarily by the engagement between the keys 15 and keyways 16. This part of the connection system is extremely strong, since loading is taken over the full length of each key 15, and the keys 15 are normally cast-in structures. If necessary, for unusually high loading, both keys 15 and keyways 16 can be increased in size.

FIGS. 2-7 show only two sets of female portion sockets 22 and plugs 24, but it will be appreciated that female apertures 21, each with an associated female portion socket 22 and plug 24, and each corresponding to fitting apertures 30 formed in the male portion 13 of the coupling 20, are formed at spaced intervals around the coupling 20.

Figure 13:
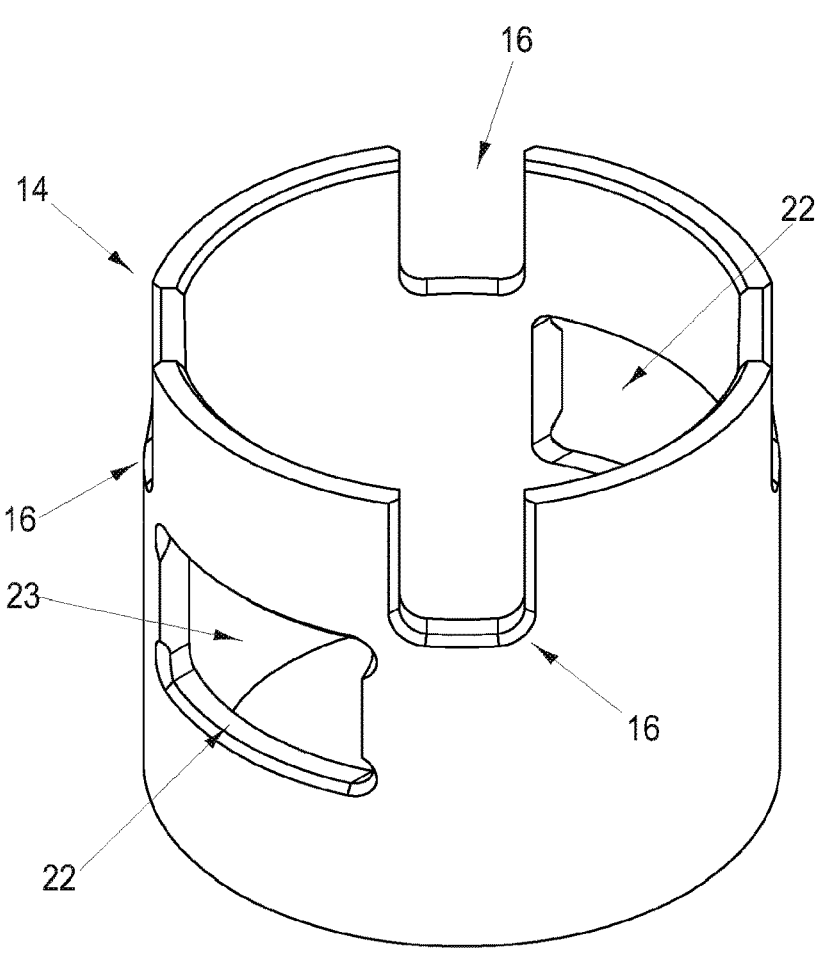
FIG. 13 is a pictorial view of a further variant of the female portion which has the female portion socket formed into the side wall of the female portion.

Referring to FIG. 13 a further variant of the female portion 14 in pictorial form is shown. In this variant the female portion socket 22 is formed into the female portion 14 rather than being a separate component welded or otherwise rigidly fixed into a female aperture 21 (see FIG. 2). This variant avoids the need to weld or otherwise fix a separate female portion socket 22/22a to the female portion 14.

Figure 14:
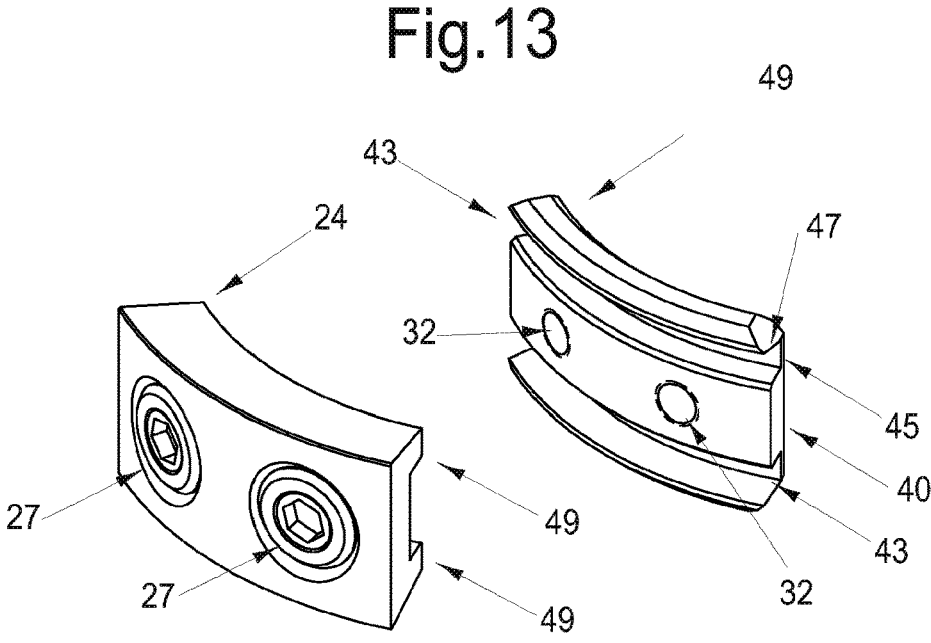
FIG. 14 shows a pictorial view of a plug and corresponding male portion fitting separate from other components.

Referring to FIG. 14 a pictorial view of a matching plug 24 and male portion fitting 31 is shown, in this variant one of the securing bolts 27 is a captive bolt. Both securing bolts 27 can be captive, but this may make assembly/disassembly more difficult. In this variant the two bosses 32 are formed (or pressed) into a longitudinally aligned central rib 40 that when the male portion fitting 31 is installed is circumferentially aligned.

Immediately adjacent each side of this central rib 40 are engagement grooves 43 which are similar to the V-shaped grooves 35. The engagement grooves 43 have a flat base 45 and only one angled face 47, the face that does not form part of the central rib 40, when viewed in cross-section. Each engagement groove 43 is dimensioned and contoured to engage with a longitudinally aligned engagement ribs 49 which are part of the plug 24. In use the engagement ribs 49 engage with the engagement grooves 43 and the securing bolts 27 lock them together.

Figure 16:
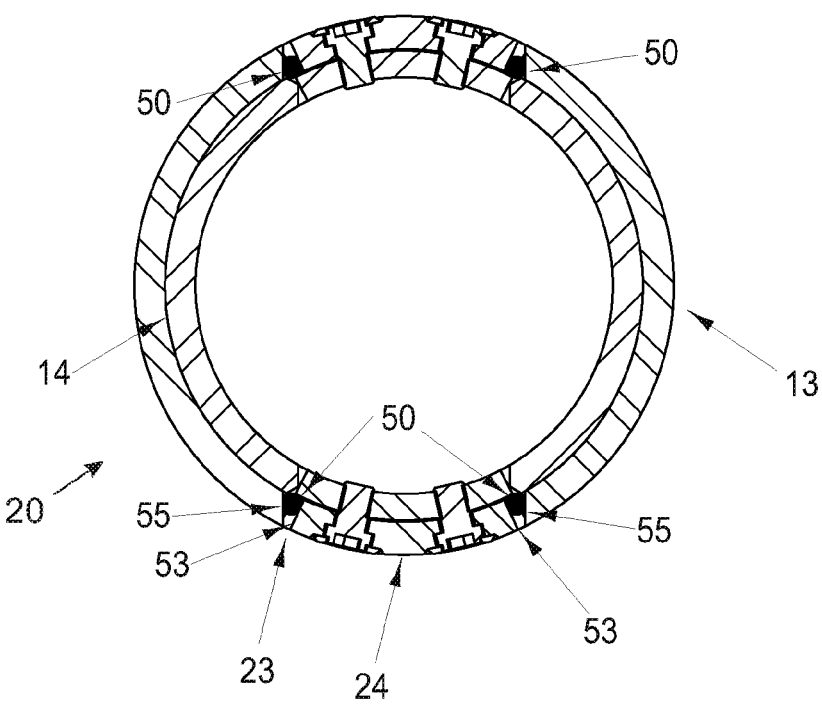
FIG. 16 is a cross-sectional view of the coupling shown in FIG. 15 along the line E-E.
Figure 15:
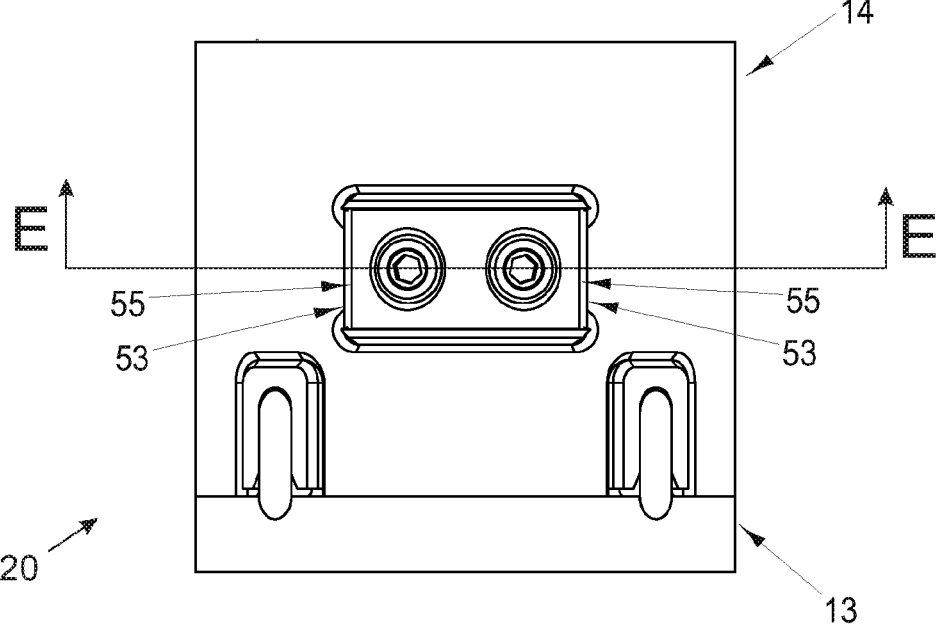
FIG. 15 is a side view of the coupling incorporating the female portion shown in FIG. 13 with the male and female portions fully engaged.

Referring to FIG. 15 and FIG. 16 a coupling 20 incorporating the variant female portion 14 shown in FIG. 13 is shown in side view and cross-sectional view along the line E-E.

In FIG. 16 a plug seal 50 is shown between each end of the plugs 24 and female portion socket 22. These plug seals 50 are in place to act as seals to prevent unwanted material entering the spaces between the plug ends 53, the longitudinal terminal ends of the plugs 24, and the circumferentially separated opposite faces of the central aperture 23, the central aperture end faces 55. The plug seals 50 are an elastomeric material shown as oval in cross section. The plug seals 50 are intended to compress or expand to maintain this seal as the plug 24 moves within the female portion socket 22.

In FIG. 16 the central aperture end faces 55 are shown parallel to a radial extending through the centre of the central aperture 23 and the plug ends 53 are shown radially aligned to the female portion 14, thus the plug seals 50 are trapped in a substantially trapezoidal void.

Referring to FIG. 17 a variant of the plug 24 is shown with three securing bolts 27 within corresponding fixing apertures, the central securing bolt 27 is a captive. The centre securing bolt 27 being captive is believed to aid the installation/removal of the plug 24.

With the coupling 20 of the present invention, significantly less of the torsional load is exerted on the plugs 24/24a and securing bolts 27, because of the built-in play between the plugs 24/24a and the corresponding female portion sockets 22/22a. As torsional force is exerted on the coupling 20, the portions 13, 14 initially move relative to each other until the keys 15 and keyways 16 engage, the keys 15/keyways 16 then transfer this torsional force between pipes 10,11.

Figure 5:
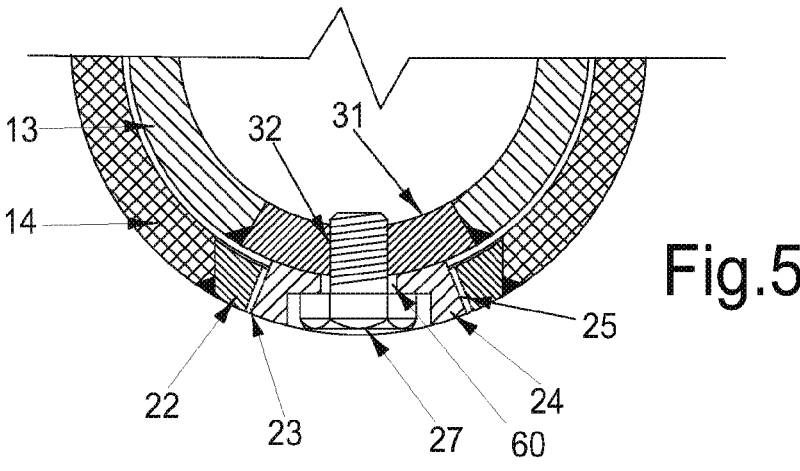
FIG. 5 is a section on line A-A of FIG. 3.

In some configurations, as shown in FIG. 5 with a single securing bolt 27, each securing bolt 27 is a loose fit. By loose fit in this case, it means there is a securing clearance 60 of between 0.05D and 0.2D (where D is the securing bolt 27 diameter) between the securing bolt 27 and the corresponding fixing aperture 26. The presence of this securing clearance 60 permits a small amount of movement between the portions 13,14 of the coupling 20 before the sides of each plug 24/24a engage with/contact the adjacent sides of the female portion socket 22/22a, as such there is additional movement between portions 13,14 available to allow the keys 15 and keyways 16 to engage prior to any torsional load being transferred to the securing bolts 27.

The above described design allows for the absorption by the coupling 20 of high torsional forces without causing undue wear (and therefore damage) to the sockets 22/22a, plugs 24/24a or securing bolts 27.

Figures 18, 19A, 19B, 19C:
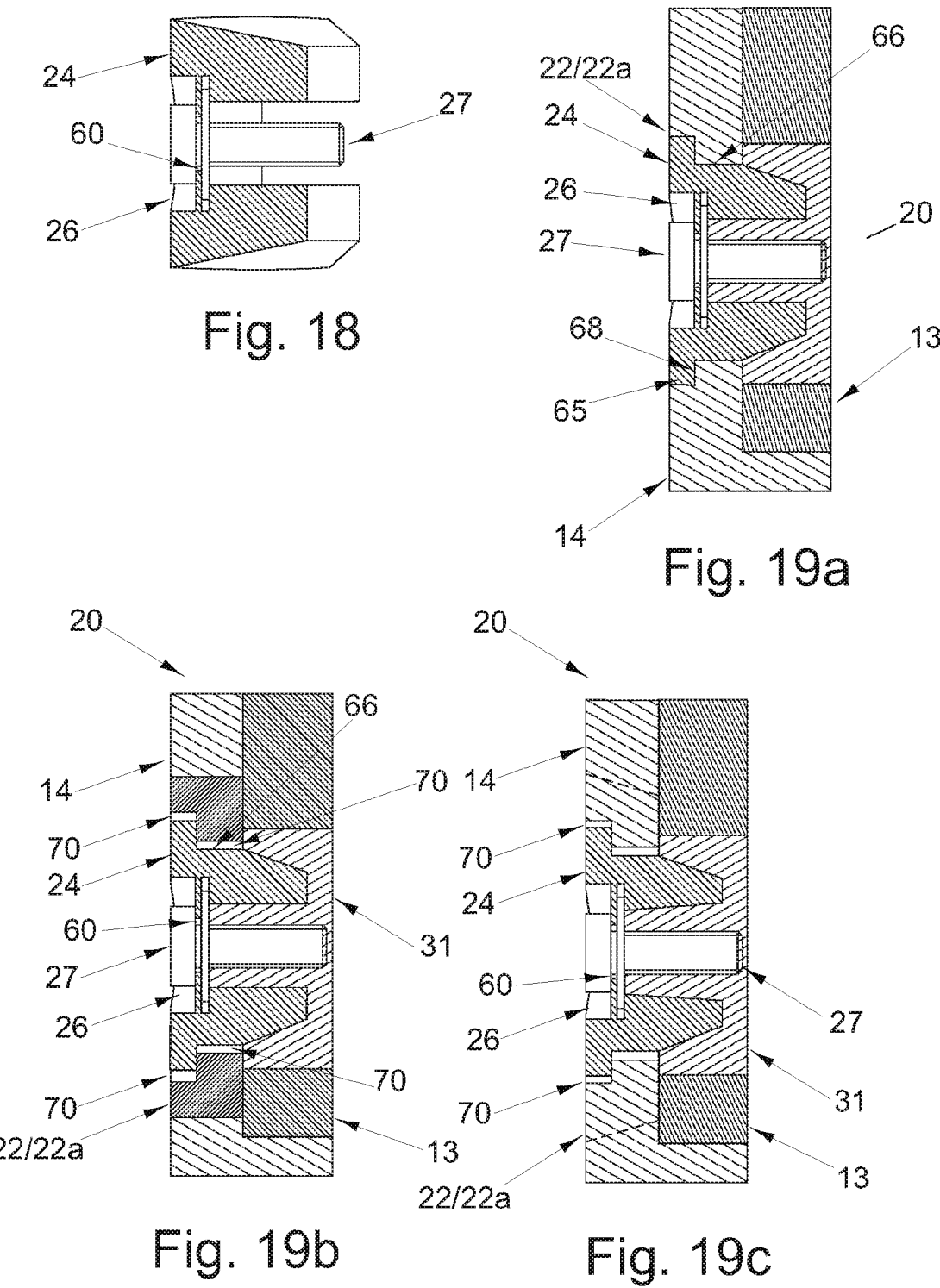
FIG. 18 is a cross-sectional view through the plug shown in FIG. 17 along line H-H in the direction of the arrows.
FIGS. 19*a* to 19*e* are cross-sectional views similar to FIG. 7*b* of various variants of the plug.

Referring to FIG. 18 a cross-sectional view of the plug 24 shown in FIG. 17 along the line H-H is shown. In this variant the centre securing bolt 27 is a captive bolt and it includes the securing clearance 60.

In some variants there is minimal free play between securing bolts 27 and the corresponding fixing aperture 26, there is little or no securing clearance 60 (see FIG. 4 or 18).

Referring to FIGS. 19a to 19c a number of cross-sectional variations of the plug 24 engaged with the complementary female socket 23 and male fitting 31.

FIG. 19a shows a cross-sectional view of a plug 24 that has a lip 65 and parallel section 66 where it passes through the female portion 14 and a taper similar to that shown in FIG. 4, 5, 7b, 10 or 18 in the male portion 13. The lip 65 sits on top of a complementary shelf 68 in the female portion socket 22/22a. In this variant the female portion socket 22/22a is formed into the female portion 14. This configuration allows the tensile clamping forces holding the male portion 13 to the female portion 14 to be distributed along the shelves 68 whilst the taper locks the plug 24 into the male fitting 31. The lip 65 can move relative to the complementary shelf 68 as there is a coupling gap (WA-W).

FIG. 19b shows a cross sectional view similar to FIG. 19a, however there is a primary gap 70 between the plug 24 and the female portion socket 22/22a that allows the plug 24 to move co-axially with respect to the portions 13,14 when there is a securing clearance 60 present. The securing clearance 60 in combination with the primary gap 70 allow a predetermined amount (1 mm to 10 mm) of coaxial movement between the pipes 10,11 so that the engagement of the male shoulder 10a with the free end 14a of the female portion 14, and/or the engagement of the end 13a of the male portion 13 of the coupling with the female shoulder 11a can occur.

FIG. 19c shows a cross-sectional view similar to FIG. 19b, however the taper in the male portion 13 is an asymmetric truncated 'V' shape.

Figures 19D, 19E:
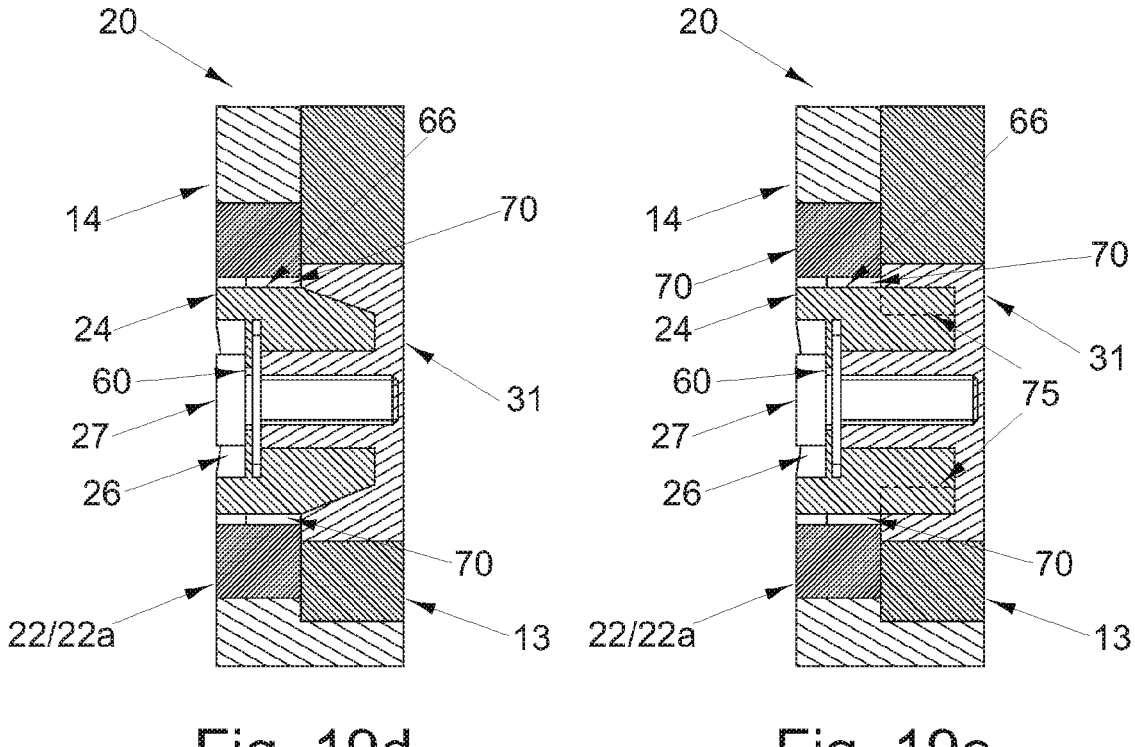

FIG. 19d shows a cross-sectional view similar to FIG. 19b, however in this case the parallel section 66 extends the entire thickness of the female section (there is no lip 65 as shown in FIG. 19a). This variant provides the same extended contact area between the plug 24 and the female portion socket 22/22a during extraction of the pipes 10,11 joined by the pipe coupling 20. As can be seen the plug 24 engaged with the female portion socket 22/22a allows the torsional, compressive and extraction forces to be transmitted even though there is no direct clamping force applied to connect the portions 13,14 together.

FIG. 19e shows a cross-sectional view similar to FIG. 19d, however there is no taper on the plug 24 or the male fitting 31. This variant is shown in two different configurations, the first with the parallel section of the plug 24 extending the full length of the plug 24 and, in dashed lines 75, the plug 24 (in cross-section) being 'T' shaped (the plug 24 steps down in size within the male fitting 31). These two options do not have the expected advantage of the taper.

It should be noted that individual compatible features of the variants shown in FIGS. 19a to 19e can be combined without deviating from the inventive concept.

Figure 20:
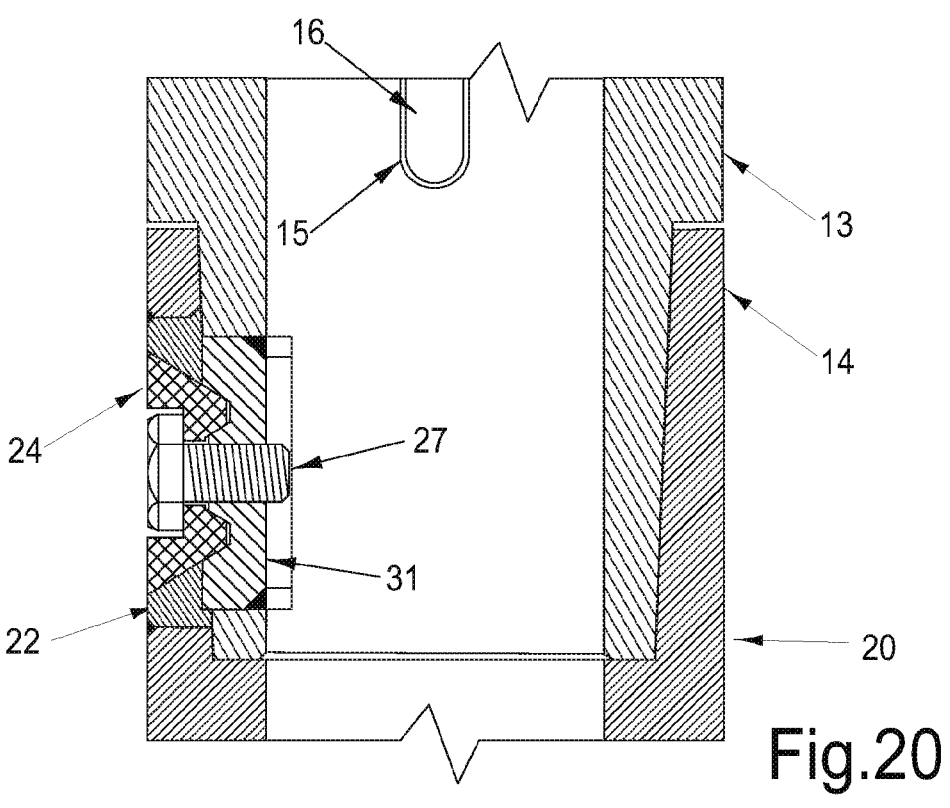
FIG. 20 is a cross-sectional view similar to that shown in FIG. 4 of a variant coupling where the engaged sections of the male and female portions have complementary tapers.

Referring to FIG. 20 a cross-sectional view of a further variant is shown, in this variant the male portion 13 is tapered where it engages with the female portion 14, and the female portion 14 incorporates a complementary taper. These complementary tapers are not intended to transmit the compressive forces between the male and female portions 13,14 they are incorporated to make the assembly and disassembly of the pipe coupling 20 easier. The complementary tapers may pass compressive forces due to wear or specific purposes.

Figures 21, 22, 23, 24, 25:
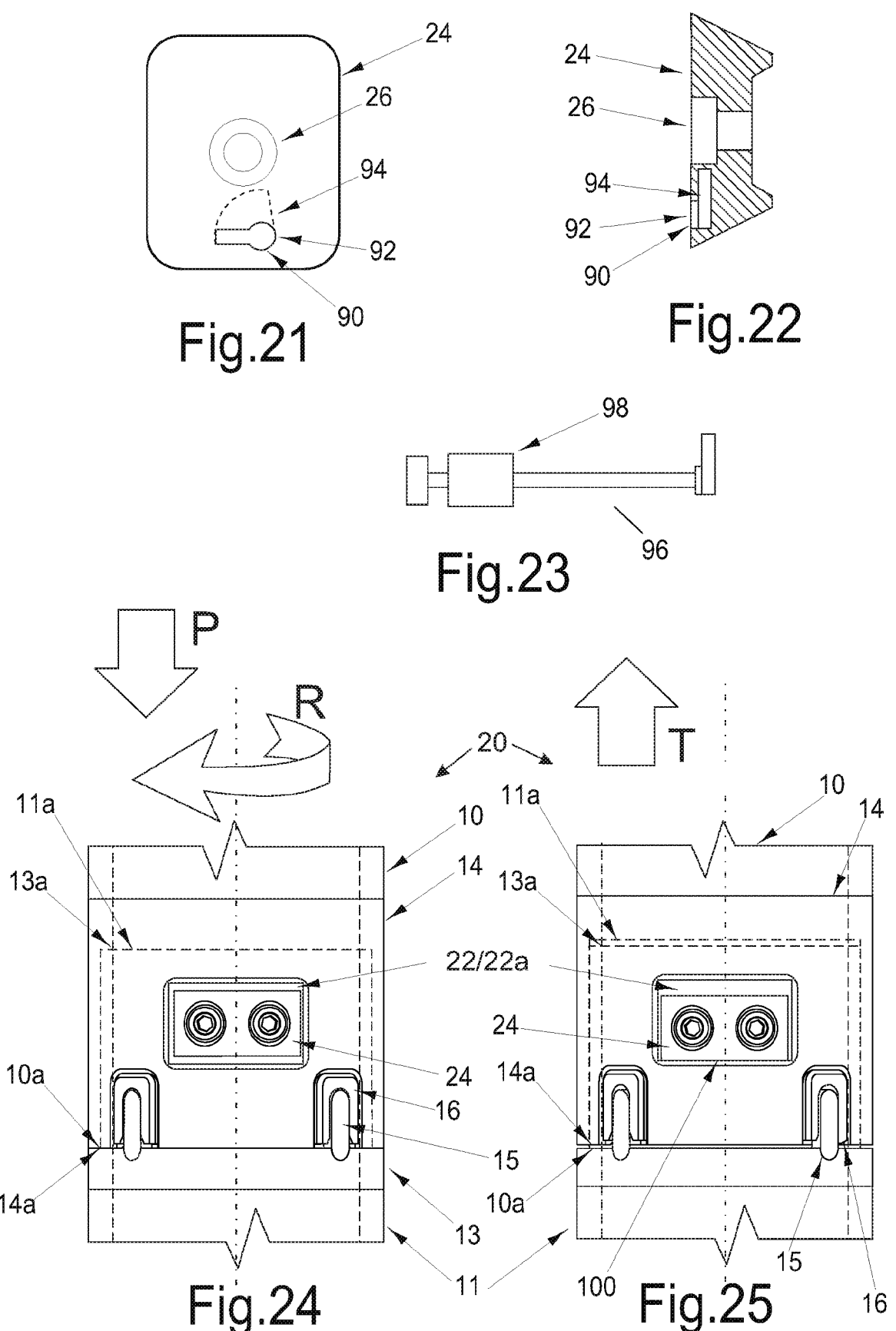
FIG. 21 is a plan view of a variant plug with an extraction socket.
FIG. 22 is a cross-sectional view of the plug shown in FIG. 21.
FIG. 23 is a side view of a slide hammer configured to engage with the extraction socket.
FIG. 24 is a side view of the pipe coupling with the female portion being moved in the direction of arrow P (towards the male portion) whilst being rotated in the direction of arrow R.
FIG. 25 is a side view of the pipe coupling with the female portion being moved in the direction of arrow T.

Referring to FIGS. 21 and 22 a variant plug 24 with an extraction socket 90 is shown in plan and cross-sectional view. The extraction socket 90 includes an extraction aperture 92 and an extraction cavity 94. The extraction aperture 92 is dimensioned to accept one end of a slide hammer 96, and the extraction cavity 94 is a void within the plug 24 that is the swept cross-section of the portion of the slide hammer 96 that engages with the extraction socket 90. To extract a plug 24 that is stuck in a coupling 20 (see FIG. 20 for example) the extraction hammer 96 is inserted through the extraction aperture 92 and then turned within the extraction cavity 94, the slide 98 portion of the slide hammer 96 is then used to generate force impulses to extract the plug 24. If one of the securing bolts 27 is captive then this can also be used to assist removal of the plug 24, alone or in combination with the extraction socket 90.

In a further variant, not shown, the side walls of the pipes 10,11 and coupling 20 include a fluid cavity that extends through all components and includes the required sealing to allow a fluid to pass along the length of a joined pipeline using these couplings 20.

The various variants (please refer to the accompanying drawings FIG. 2-FIG. 22) can be combined without deviating from the inventive concept, that is to form a pipe coupling 20 that allows a certain amount of circumferential movement between the male and female portions 13 of the coupling 20 so that the keys 15 and keyways 16 transmit the majority if not all of the torsional forces. This circumferential movement may be due to a predetermined spacing between the securing bolts 27 and the corresponding fixing aperture 26 (the securing clearance 60), the different circumferential lengths of the plug 24 and central aperture 23, or a combination of the two. In addition there may be a predetermined amount of co-axial (longitudinal) movement allowed for between the pipes 10,11 so that the majority of the compressive forces can be transmitted by the engagement of the male shoulder 10a with the free end 14a of the female portion 14, and/or the engagement of the end 13a of the male portion 13 of the coupling 20 with the female shoulder 11a.

Referring to FIGS. 24 and 25. the pipe coupling 20 is shown in use. Firstly in FIG. 24 with the second pipe 11, attached to the female portion 14, being rotated in the direction of arrow R as it is being moved in the direction of arrow P (towards the first pipe 10); and secondly, in FIG. 25, with the second pipe 11 being moved in the direction of arrow T (away from the first pipe 10).

Referring to FIG. 24 the female portion 14 moves in relation to the male portion 13 until the engagement of the male shoulder 10a with the free end 14a of the female portion 14, and/or the engagement of the end 13a of the male portion 13 with the female shoulder 11a. At the same time the female socket 22/22a moves in the direction of arrow R until the keys 15 engage with the keyways 16, this occurs before the plug 24 contacts the female socket 22/22a. The plug 24 prevents the pipes 10,11 from separating, but it is not intended to transfer the compressive or torsional forces applied by the driven pipe 10,11 to the undriven pipe 10,11.

Referring to FIG. 25 the female portion 14 moves until the plug 24 contacts the female portion socket 22/22a along the circumferential length of the side of the plug 24, the plug contact side 100. The force, extraction force, applied in the direction of arrow T to the female portion 14 is then transferred to the male portion 13 at which time the pipes 10,11 move in the same direction. The extraction force is applied along the plug contact side 100 allowing the male shoulder 10a to disengage from the free end 14a of the female portion 14, and/or the end 13a of the male portion 13 to disengage from the female shoulder 11a (where there is sufficient clearance to allow the disengagement to occur). The relative movement between the male and female portions 13,14 can occur when a securing clearance 60 (see FIG. 19b) and/or primary gap 70 (see FIG. 19b) present. It should be noted that disengagement may or may not be physical disengagement/separation.

The invention claimed is:

1. A pipe coupling which includes:
a male portion which in use is rigidly secured to one end of a first pipe, coaxial with said first pipe;
a female portion which in use is rigidly secured to one end of a second pipe, coaxial with said second pipe;
the male and female portions being sized so that the male portion is an easy sliding fit within the female portion when the first and second pipes are connected together;
the male portion being provided with a series of spaced keys protruding from the outer surface thereof;
the female portion being provided with a series of spaced keyways which are dimensioned and arranged so that the keys are a sliding fit within the keyways when the male and female portions are connected together;
at least one fastener, each of the at least one fastener including:
a male portion fitting rigidly secured to, or formed in, the male portion and providing at least one internally screw-threaded bore;
a plug;
a female portion socket rigidly attached to, or formed into, the female portion, said female portion socket including a central aperture which is shaped to receive the plug therein, said female portion socket and said plug being radiused to match the radius of the female portion, and being substantially rectangular;
a securing bolt dimensioned to fit in a corresponding fixing aperture formed in said plug, said securing bolt being releasably engageable with one internally screw-threaded bore of the at least one internally screw-threaded bore; and
the male portion fitting is shaped, at least in part, to receive a portion of the plug;

wherein said plug is sized relative to the female portion socket such that the plug has a predetermined amount of movement relative to the female portion socket in either direction around the circumference of the female portion, even when each securing bolt present is fully engaged with an internally screw-threaded bore of the at least one internally screw-threaded bore.

2. The pipe coupling as claimed in claim 1, characterised in that there are a plurality of male portion fittings spaced around the male portion and a corresponding plurality of female portion sockets spaced around the female portion.

3. The pipe coupling as claimed in claim 2, characterised in that the plurality of male portion fittings and female portion sockets are circumferentially equispaced around the male portion and female portion.

4. The pipe coupling as claimed in claim 1, characterised in that there is more than one fixing aperture in each plug.

5. The pipe coupling as claimed in claim 1, characterised in that at least one securing bolt is captive in each plug.

6. The pipe coupling as claimed in claim 1, characterised in that there are 2 to 4 fixing apertures in each plug.

7. The pipe coupling as claimed in claim 1, characterised in that the predetermined amount of movement between the plug and the corresponding central aperture is (WA-W)=1 mm to 50 mm, where WA is the circumferential dimension of the central aperture and W is the circumferential length of the plug.

8. The pipe coupling as claimed in claim 7, characterised in that (WA-W)=1 mm to 13 mm.

9. The pipe coupling as claimed in claim 7, characterised in that (WA-W)=2 mm to 8 mm.

10. The pipe coupling as claimed in claim 1, characterised in that there is a predetermined securing clearance between corresponding fixing apertures and the securing bolt which they receive.

11. The pipe coupling as claimed in claim 10, characterised in that the predetermined securing clearance between corresponding fixing apertures and the securing bolt is in the range 0.05D and 0.2D, where D is the securing bolt diameter.

12. The pipe coupling as claimed in claim 1, characterised in that the plug is tapered on all faces that engage with the male portion fitting or female portion socket.

13. The pipe coupling as claimed in claim 1, characterised in that the plug is tapered only for a portion, a tapered portion, that engages with the female portion socket.

14. The pipe coupling as claimed in claim 1, characterised in that the plug is tapered for a portion, a tapered portion, that engages with the male portion fitting and parallel where it engages with the female portion socket.

15. The pipe coupling as claimed in claim 12, characterised in that, where possible, the tapered portion is radially aligned to the female portion.

16. The pipe coupling as claimed in claim 1, characterised in that both circumferentially separated opposite faces of the central aperture, when viewed in a cross section across the pipe coupling, are parallel to a radial line extending from the centre of the pipe coupling through the centre of the central aperture.

17. The pipe coupling as claimed in claim 1, characterised in that both circumferentially separated opposite ends of the plug, when viewed in a cross section across the pipe coupling, are, aligned with a radial line extending from the centre of the pipe coupling.

18. The pipe coupling as claimed in claim 1, characterised in that both circumferentially separated opposite faces of the central aperture, when viewed in a cross section across the pipe coupling, are parallel to a radial line extending from the centre of the pipe coupling and the circumferentially separated opposite ends of the plug, when viewed in a cross section across the pipe coupling are, aligned with a radial line extending from the centre of the pipe coupling.

19. The pipe coupling as claimed in claim 18, characterised in that an elastomeric plug seal is between the adjacent circumferentially separated opposite faces of the central aperture and circumferentially separated opposite ends of the plug.

20. The pipe coupling as claimed in claim 1, characterised in that there is a primary gap between the plug and the female portion socket, where said primary gap spaces the plug and female portion socket apart co-axially to the pipe coupling.

* * * * *